United States Patent [19]
Maeda

[11] Patent Number: 4,986,723
[45] Date of Patent: Jan. 22, 1991

[54] ANTHROPOMORPHIC ROBOT ARM

[75] Inventor: Yuji Maeda, Kashiwa, Japan

[73] Assignee: Agency of Industrial Science & Technology, Ministry of International Trade & Industry, Tokyo, Japan

[21] Appl. No.: 440,113

[22] Filed: Nov. 22, 1989

[30] Foreign Application Priority Data

Nov. 25, 1988 [JP] Japan .................. 63-297556

[51] Int. Cl.$^5$ .............................. B25J 15/08
[52] U.S. Cl. ..................... 414/729; 901/21; 901/36; 294/111; 623/64; 74/89.22
[58] Field of Search ............ 414/729, 735; 901/21, 901/36, 38; 294/111, 106; 74/89.22; 623/64

[56] References Cited

U.S. PATENT DOCUMENTS 4,643,473  2/1987  Douglas ................. 294/111
4,834,761  5/1989  Walters ............... 294/111 X
4,865,376  9/1989  Leaver et al. ........... 901/21 X Primary Examiner—David A. Bucci
Assistant Examiner—Donald W. Underwood
Attorney, Agent, or Firm—Oblon, Spivak, McClelland, Maier & Neustadt

[57] ABSTRACT

An anthropomorphic robot arm includes a hand section, wrist section and arm section. The hand section comprises a base plate, a plurality of flexible fingers which have a plurality of joints and are rotatably supported by the base plate, and one thumb which has a plurality of joints and is supported by the base plate such that it is able to rotate in a direction so that it is opposable to the flexible fingers. A group of actuators contained within the arm section independently drive each joint of the fingers, giving them the same movements as a human arm.

8 Claims, 5 Drawing Sheets

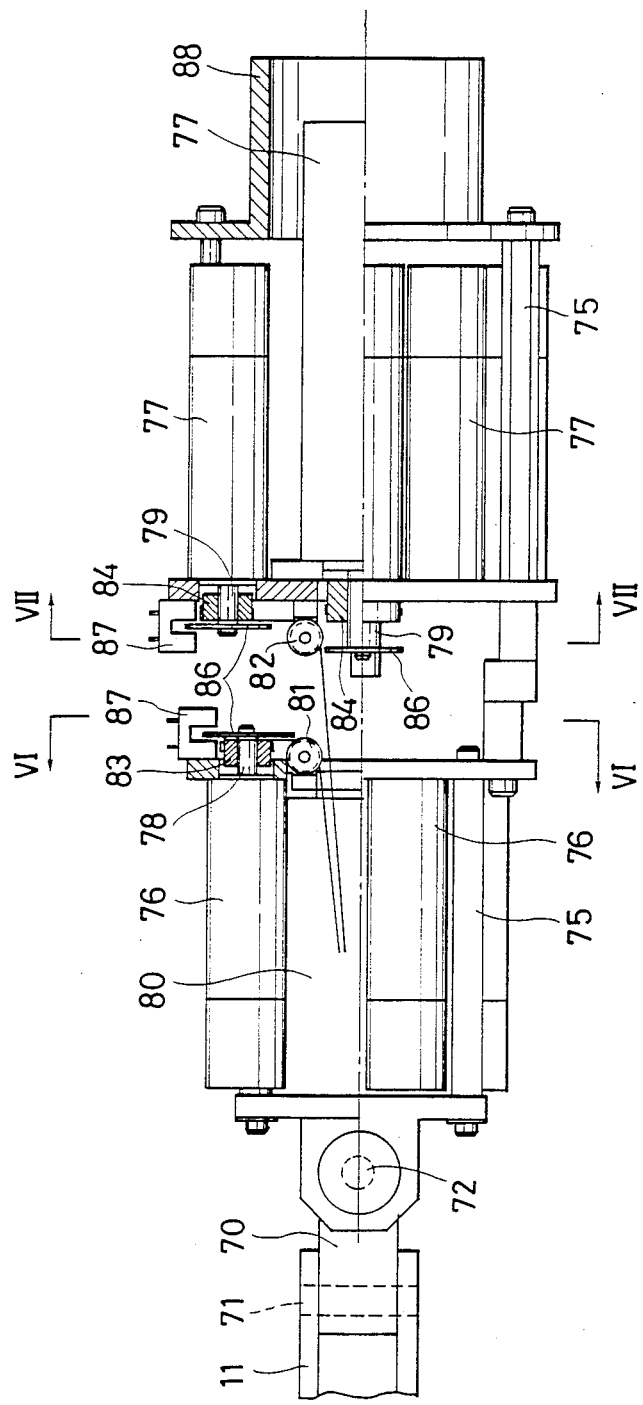

ANTHROPOMORPHIC ROBOT ARM

BACKGROUND OF THE INVENTION

1. Field of the Invention

This invention relates to an anthropomorphic robot arm used to carry out various types of work normally carried out manually by humans, and particularly to an anthropomorphic robot arm which can be used as the end factor for robots, prosthetic arms or other types of manipulators.

2. Prior Art Statement

The degrees of freedom of the human arm are centered in the wrist and hand, enabling it to execute complex and agile movements. But with a robot arm intended to simulate the human arm, placing actuators in these same locations to achieve the same degrees of freedom and similarly move corresponding joints typically results in these parts becoming extremely heavy, making the robot arm extremely large and unwieldy, unable to withstand the rigors of realistic use.

Nevertheless, when contemplating a robot arm to be used as a substitute for a human arm, it is preferable that it have degrees of freedom similar to those of the human hand and wrist which are able to carry out a great diversity of tasks. It should also appear as similar to the real thing as possible and be easily to control.

Specifically, by providing slave units which comprise the robot arm at positions corresponding to the human hand and wrist, arranging the slave units in the form of a human hand and arm, and enclosing the structural elements inside these slave units to give an external appearance similar to the human hand and arm, a one-to-one correspondence can be achieved with a master device mounted on a human arm to send command signals to operate the fingers and the like, resulting in control becoming extremely simple.

However, although grasping mechanisms of various structures have been proposed in the past, any robot arm which has on its hand five fingers which function similarly to human fingers, and is similar to the human arm even in the shape of the upper arm has been, as described above, of such complex structure and extremely large size as to be unwieldy impractical, so we are as yet not aware of a practical proposal.

The object of this invention is to provide a robot arm of a structure which is functionally as similar as possible to the human hand and arm, and particularly has on its hand five fingers which function similarly to human fingers, and is similar to the human arm even in the shape of the upper arm.

SUMMARY OF THE INVENTION

In order to achieve the above objects, the anthropomorphic robot arm of the invention comprises a hand section, wrist section and arm section, in which said hand section comprises a base plate, a plurality of flexible fingers, each of which has a plurality of joints allowing it to bend at these joints and is supported by the base plate such that it is able to rotate in a direction such that the space between the flexible fingers can open and close, one thumb having a plurality of joints allowing it to bend at each joint and is supported by the base plate such that it is able to rotate in a direction so that it is opposable to the flexible fingers, and pulleys provided on each joint of the flexible fingers and thumb so that the joint can be bent, and these pulleys each carry wires, said wrist section is made up of a coupling which rotatably supports the base plate of the hand section, and said arm section comprises a tube-shaped structural member which rotatably supports the coupling of the wrist section, and actuators which are built into the inside of this tube-shaped structural member and are connected to the ends of wires carried on the pulleys of each joint, so that they are able to act to cause each joint to rotate, thus causing bending motion of each finger to be carried out.

In the robot arm of the above configuration, by using four flexible fingers and three joints per flexible finger and thumb, a configuration identical to the human hand can be achieved. By dividing the plurality of actuators into two groups, and arranging the groups of actuators on the inside surface of the tube-shaped structural member so that their output shafts face each other, and by passing the plurality of wires carried by the joint pulleys through a central airspace in one of the groups of actuators arranged in a ring, and then connecting the wires to the actuators, the shape of the whole can closely approximate that of a human hand and wrist. Since the wires pass through a central airspace in the arm section, leading to the joint pulleys, limited space can be exploited effectively. Furthermore, if the end joint of the fingers is constructed so that it bends only in proportion to the bending of the other joints, the number of actuators used can be reduced, the device made lighter and the construction made simpler and more economical.

The above and other features and objects of the invention will become apparent with the following detailed description made with reference to the drawings.

BRIEF DESCRIPTION OF THE DRAWINGS

FIG. 5 is an enlarged partially sectioned plan view of the arm section of the robot arm of FIG. 1.

DETAILED DESCRIPTION OF THE PREFERRED EMBODIMENTS

Figure 1:
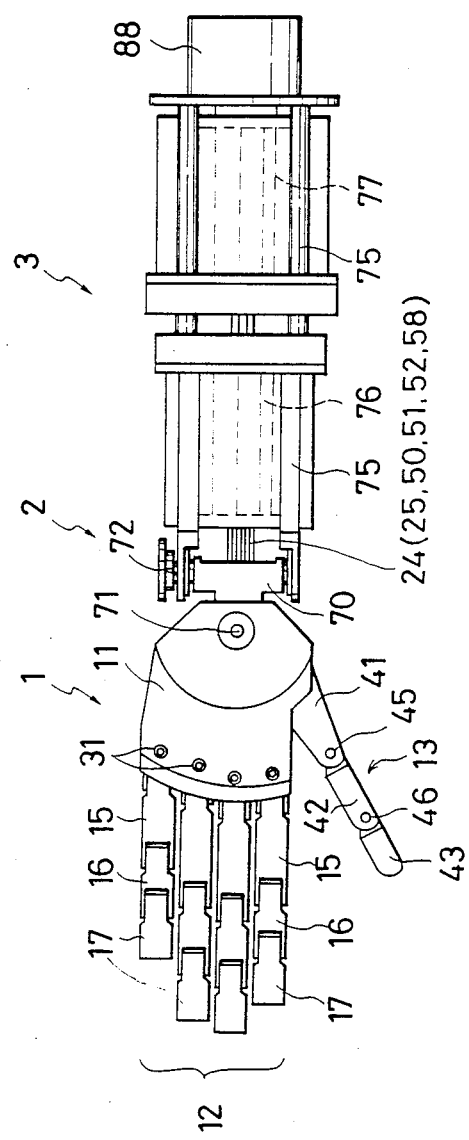
FIG. 1 is a plan view of one embodiment of the anthropomorphic robot arm of the invention.

FIG. 1 shows a preferred embodiment of the overall structure of the anthropomorphic robot arm of the invention. This robot arm is made up of a hand section 1, wrist section 2 and arm section 3.

The hand section 1 comprises a base plate 11 to which four flexible fingers 12 able to bend at their first, second and third joints are connected such that they are able to rotate so that the space between the flexible fingers can be opened and closed. A thumb 13 able to bend at its first, second and third joints is also connected in such a way that it is able to turn so that it is opposable to the other four fingers.

Figure 2:
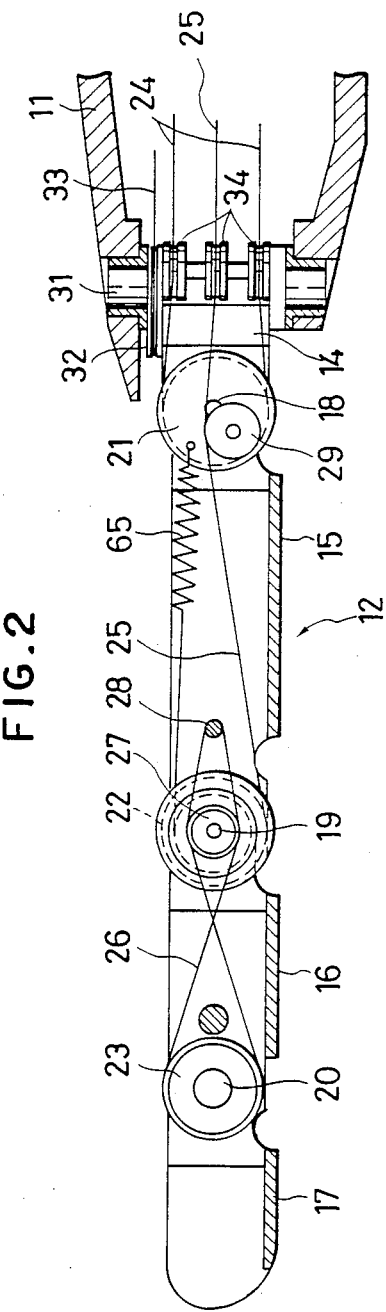
FIG. 2 is an enlarged vertical sectional view of a flexible finger of the robot arm of FIG. 1.
Figure 3:
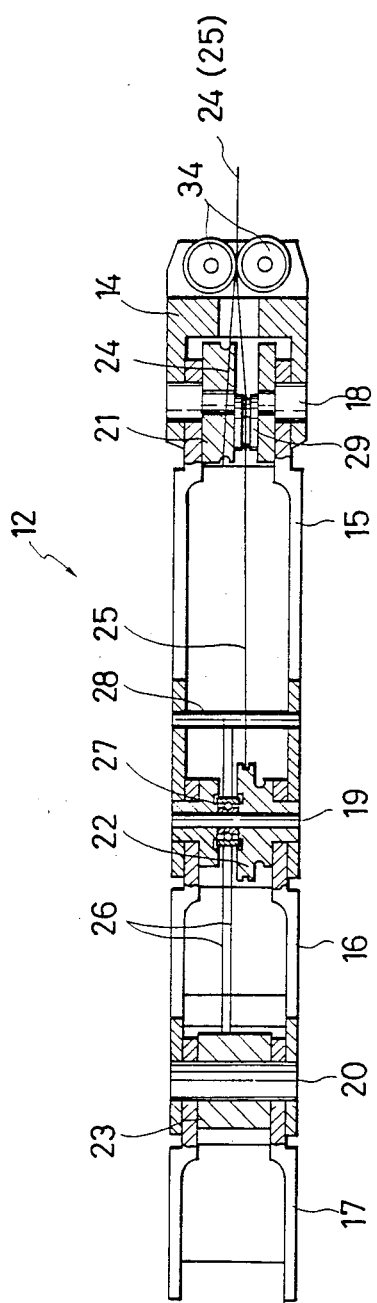
FIG. 3 is an enlarged transverse sectional view of the flexible finger of FIG. 1.

More specifically, the flexible fingers 12, as shown in detail in FIG. 2 and FIG. 3, are made up of a base-side member 14 and finger sections 15, 16 and 17 rotatably connected in succession by connection shafts 18, 19 and 20, forming a joint at each connection shaft section.

These finger sections 15, 16 and 17 are each provided with pulleys 21, 22 and 23, on the connection shafts 18, 19 and 20 located on the base sides of each finger section. The pulleys are fixed with respect to their finger section but able to rotate with respect to the connection shafts 18, 19 and 20. Of these pulleys 21, 22 and 23, the first and second joint pulleys 21 and 22 carry wires 24 and 25 which are pulled by an actuator (to be described later) provided within the arm section 3 so that the corresponding pulleys, along with the finger sections to which they are fixed, rotate about their connection shaft, thus executing the bending motion of the fingers.

Independent bending of the third joint of the four fingers on the human hand, other than the thumb, is extremely rare, since it typically bends to a certain amount only in concert with the movement of the second joint. So in this preferred embodiment, the flexible fingers 12 are configured such that the third joint has approximately one-half the bending motion of the second joint, as measured by degree of bending. This is done by providing a wire 26 which follows a figure "8" extending around a pulley 23 provided on the third joint and back to another pulley 27 rotatably mounted on connection shaft 19 on the second joint, with the ends of the wire are secured to a pin 28 provided on finger section 15. As a result, since no actuator is required to drive this joint, the construction is just that much simpler.

The first joint is also provided with a guide roller 29 to make a wire 25, used to bend the second joint, pass as close as possible to the center of rotation of connection shaft 18, thus preventing the bending of the first joint and the bending of the second joint from interfering with each other.

As is evident from FIG. 1 and FIG. 2, the four flexible fingers 12 in the above configuration are mounted on base plate 11 of the hand section 1, but with respect to the method of this mounting, the base-side members 14 described above are supported by mounting shafts 31 whose axes are aligned perpendicularly to the direction of connection shaft 18, so that the space between the flexible fingers 12 can be opened and closed. The flexible fingers 12 are driven to rotate around these mounting shafts 31 by wires carried by pulleys 32 fixed to the mounting shafts 31. These wires 33 are in turn driven by actuators provided within the arm section 3.

When the base-side members 14 are driven to rotate around the mounting shafts 31 in this manner, the wires 24 and 25 carried on pulleys 21 and 22 on the base side of finger sections 15 and 16 must be prevented from expanding or contracting due to this rotary driving. To this end, as is evident from FIG. 2 and FIG. 3, guide rollers 34 are used to guide wires 24 and 25 so that they pass nearly through the center of the mounting shafts 31.

Figure 4:
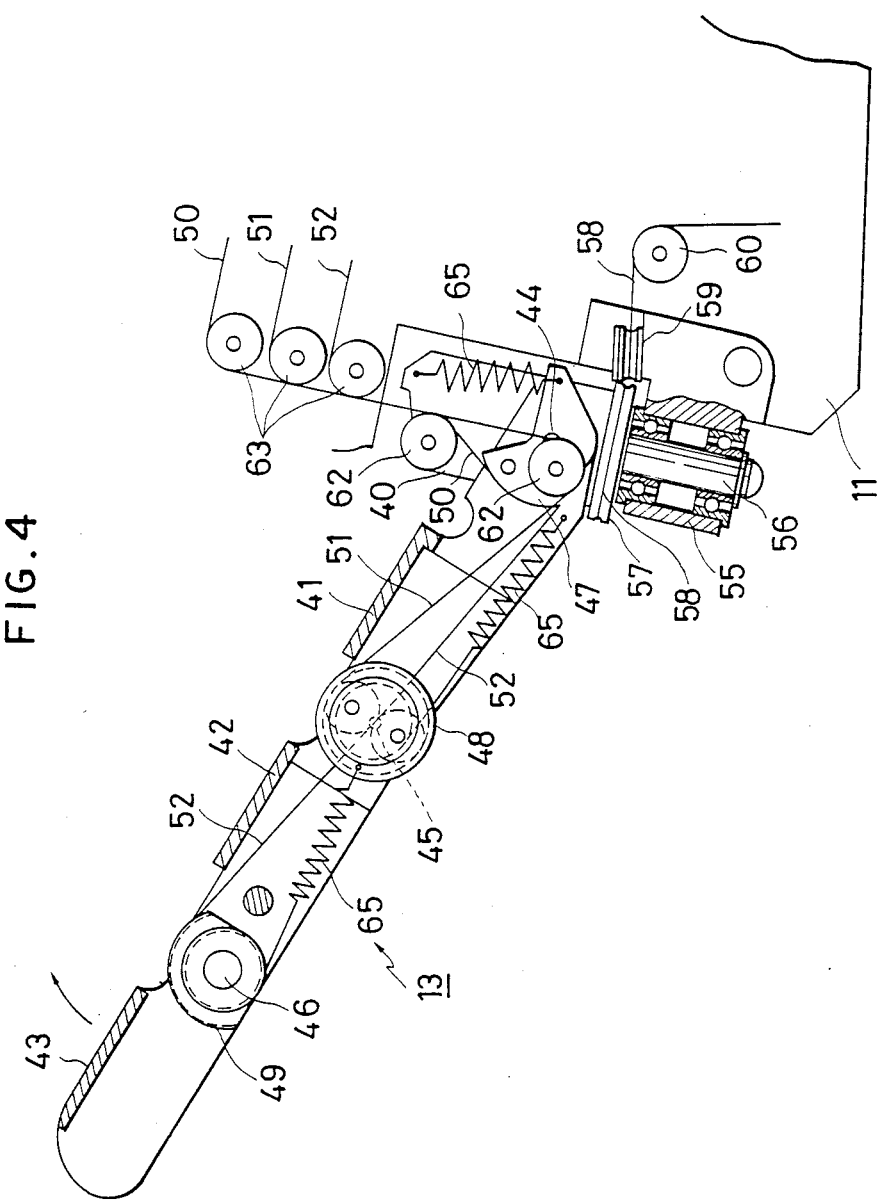
FIG. 4 is a transverse sectional view of the thumb of the robot arm of FIG. 1.

On the other hand, the thumb 13 shown in FIG. 1 has a structure as shown in detail in FIG. 4. FIG. 4 shows the thumb 13 as seen from the palm side. A base-side member 40 and finger sections 41, 42 and 43 are rotatably connected in succession by connection shafts 44, 45 and 46, forming the first, second and third joints. These finger sections 41, 42 and 43 are each provided with pulleys 47, 48 and 49 on the connection shafts 44, 45 and 46 located on the base sides of the finger sections. The pulleys are fixed with respect to their finger section but able to rotate with respect to the connection shafts 44, 45 and 46. These pulleys 47, 48 and 49 carry wires 50, 51 and 52 which are pulled by an actuator (to be described later) provided within the arm section 3.

With respect to the method of mounting this thumb 13 to the base plate 11 of hand section 1, a mounting member 55 is provided extending from the base plate 11 described above to allow mounting of the base-side member 40 so that its axis lies in the direction in which the flexible fingers 12 extend, or in a direction slightly canted from this direction. The base-side member 40 is rotatably supported on this mounting member 55 by a mounting shaft 56. A pulley 57 is fixed to the mounting shaft 56 so that a wire 58 carried by this pulley 57 is connected, via guide rollers 59 and 60, to an actuator provided within the arm section 3. Therefore, when the actuator pulls or relaxes wire 58, the thumb 13 is turned to a position either facing in the same direction as the other four fingers, or a position opposing the other four fingers or any position in between.

When the base-side member 40 is driven to rotate about mounting shaft 56 in this manner, the wires 50, 51 and 52 carried on pulleys 47, 48 and 49 on the base side of finger sections 41, 42 and 43 must be prevented from expanding or contracting due to this rotary driving. To this end, guide rollers 62 are used to guide wires 50, 51 and 52 so that they pass nearly through the center of the mounting shaft 56. Thereafter, these wires 50, 51 and 52 are guided by pulleys 63 and led to actuators provided within the arm section 3. Therefore, when mounting shaft 56 is rotated, although the wires 50, 51 and 52 will be slightly twisted between guide rollers 62 and guide rollers 63, but expansion of these wires will not occur and neither will interfere with the motion of the other.

Note that in FIG. 2 and FIG. 4, the numbers 65 indicate springs which connect the far end of wires pulled by the actuators to pulleys or the like to provide return force.

The wrist section 2, as is evident in FIGS. 1 and 5, rotatably connects the base plate 11 of hand section 1 to a coupling member 70 with a shaft 71. This coupling member 70 is mounted on a structural member 75 of arm section 3 with a shaft 72 so that it is able to rotate up and down. Pulleys are fixed to these shafts 71 and 72 like the other shafts described above, and the wires carried by these pulleys are each connected to actuators contained within the arm section 3, like the wires of the hand section 1, allowing each to be independently driven to rotate.

In the preferred embodiment depicted, in order to approximate a human arm as closely as possible, the hand section 1 has five fingers which execute the major movements, and of these fingers, the thumb is given four degrees of freedom while the third joint of other four fingers is allowed to bend only to an appropriate degree in relation to the bending of the second joint, thus reducing the number of actuators required and reducing weight. Furthermore, the wrist section 2 is given two degrees of freedom. Therefore, this robot arm has a total of eighteen degrees of freedom, so from a functional standpoint, it has nearly the same number of degrees of freedom as a human arm.

However, the robot arm of the invention is in no way limited to the preferred embodiment depicted, but rather, as long as one remains within the spirit of the invention, it may be freely modified depending on the purpose of its use, as by changing the number of flexible fingers to 3 or 2, reducing the number of joints to 2, or by making all joints driven by actuator.

Figure 7:
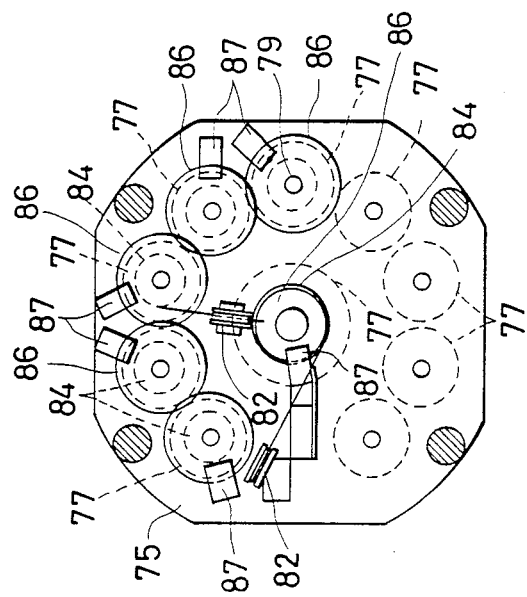
FIG. 7 is a sectional view taken along line VII—VII of FIG. 5.
Figure 6:
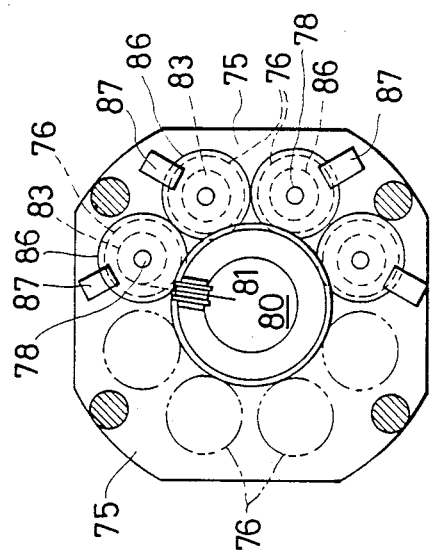
FIG. 6 is a sectional view taken along line VI—VI of FIG. 5.

As shown in FIGS. 5 through 7, the arm section 3 contains eighteen actuators (motors) mounted on the structural member 75 which maintains the strength of the entire structure. The actuators take up the wires used to operate the eighteen degrees of freedom of the hand section 1 and wrist section 2. Note that in order to avoid complicating the diagrams, only some of the actuators, etc., are shown and the rest are omitted.

With respect to the mounting of these eighteen actuators in the arm section 3, in order to approximate a human forearm as closely as possible in this preferred embodiment, the actuators are divided into two groups: a group of eight actuators 76 contained in the wrist side shown in FIG. 6 and a group of ten actuators 77 contained in the elbow side shown in FIG. 7. Both groups of actuators 76 and 77 are mounted on the inside surface of the tube-shaped structural member 75 of the arm section 3 with their output shafts 78 and 79 facing each other, thus closely approximating the dimensions and shape of a human arm.

The wires extending from the various joints in the hand section 1 and wrist section 2 to the actuators follow set paths formed by a plurality of guide rollers and pass through a central airspace 80 within the actuators 76 arranged on the hand side of the arm leading to the area between the two groups of actuators. Here the wires are redirected by guide rollers 81 or 82 and taken up onto pulleys 83 or 84 provided on the output shafts 78 or 79 of actuators 76 or 77. Note that the ten actuators 77 contained in the elbow side of arm section 3 need not have an airspace provided in their midst, so nine of them are arranged in a ring with the remaining one placed in the central airspace. Furthermore, the parts numbered 86 in the diagram indicate disks used in the sensing of rotation, those numbered 87 are rotation sensors while 88 is a flange used for mounting the base (arm section) of this robot arm.

The robot arm described above has the same degrees of freedom as a human arm, so by forming a glove of a soft material akin to human skin and covering the robot arm with it, the arm will closely resemble a human arm not only in operation, but also in appearance.

With a robot arm of the above configuration, if for example, it were given the same dimensions as a human arm, and controllers for the actuators which operate the various joints were provided at the various joints corresponding to the mechanism of the human arm, it would be able to execute movements identical to those of a human hand in essentially real time, and thus be effective if used as a prosthetic arm or in the remote processing of hazardous substances.

As described in detail above, the robot arm of the present invention can be manufactured to resemble the human arm in appearance and function as closely as possible, and in particular, it has on its hand five fingers which function identically to the fingers on a human hand, so a robot arm which resembles the human arm even to the shape of the arm section can be obtained. At the same time, the joints are arranged so that they move independently so the bending movement of the various joints does not affect the other joints, so in cases such as if the robot arm is remotely controlled, the various degrees of motion can be controlled with a one-to-one correspondence with the control side, simplifying the control algorithms and making the arm easy to control.

What is claimed is:

1. An anthropomorphic robot arm comprising a hand section, wrist section and arm section, in which said hand section comprises
   a base plate,
   a plurality of flexible fingers, each of which has a plurality of joints allowing it to bend at these joints and is supported by the base plate such that it is able to rotate in a direction such that the space between the flexible fingers can open and close,
   one thumb which has a plurality of joints allowing it to bend at each joint and is supported by the base plate such that it is able to rotate in a direction so that it is opposable to the flexible fingers, and pulleys provided on each joint of the flexible fingers and thumb so that the joint can be bent, these pulleys each carrying a corresponding wire, a first end of which is fixed via a spring,
   said wrist section is made up of a coupling which rotatably supports the base plate of the hand section, and said arm section comprises
   a tube-shaped structural member which rotatably supports the coupling of the wrist section, and actuators which are built into the inside of this tube-shaped structural member and respectively connected to second ends of the wires carried on the pulleys of the joints for rotating the respective joints to cause bending motion of each finger.

2. The robot arm of claim 1 in which there are four flexible fingers.

3. The robot arm of claim 1 in which each flexible finger has three joints, and the joint furthest from the base plate bends in response to the bending of the other joints.

4. The robot arm of claim 1 in which the thumb has three joints.

5. The robot arm of claim 1 in which the plurality of actuators are provided in a ring on the inside surface of the tube-shaped structural member.

6. The robot arm of claim 1 in which the plurality of actuators are divided into two groups, and the groups of actuators are arranged on the inside surface of the tube-shaped structural member so that their output shafts face each other.

7. The robot arm of claim 5 in which each wire is carried by a pulley on a joint, the actuators are arranged in a ring to define a central space, and the second ends of the wires pass through the central space.

8. The robot arm of claim 6 in which each wire is carried by a pulley on a joint, the actuators are arranged in a plurality of groups each arranged in a ring to define a central space and the second ends of the wires pass through a central space in one of the groups of actuators.

* * * * *